United States Patent [19]
Dahlheimer

[11] Patent Number: 6,113,106
[45] Date of Patent: Sep. 5, 2000

[54] GIMBALLED MECHANICAL FACE SEAL

[75] Inventor: John C. Dahlheimer, Laconia, N.H.

[73] Assignee: Freudenberg-NOK General Partnership, Plymouth, Mich.

[21] Appl. No.: 08/963,496

[22] Filed: Nov. 3, 1997

[51] Int. Cl.[7] .................................................. F16J 15/16
[52] U.S. Cl. ........................... 277/433; 277/423; 384/420
[58] Field of Search ............................ 415/106, 107, 415/96; 416/241 A; 277/361, 367, 379, 385, 391, 398, 423, 424, 433; 384/420

[56] References Cited

U.S. PATENT DOCUMENTS

| | | | |
|---|---|---|---|
| 1,611,004 | 12/1926 | Derrick | 415/106 |
| 2,121,299 | 6/1938 | Peters | 277/361 X |
| 2,167,986 | 8/1939 | Lignian et al. | 277/379 |
| 2,404,690 | 7/1946 | Caserta | 277/385 X |
| 3,018,112 | 1/1962 | Amirault et al. | 277/392 |
| 4,353,558 | 10/1982 | Firth | 277/431 |
| 4,417,734 | 11/1983 | Sundberg | 277/385 |
| 4,600,318 | 7/1986 | Miller | 384/130 |
| 4,605,235 | 8/1986 | Sundberg et al. | 277/306 |
| 4,669,735 | 6/1987 | Sundberg et al. | 277/306 |
| 4,848,775 | 7/1989 | Lough | 277/562 |
| 4,925,366 | 5/1990 | Dorski | 416/241 A X |

*Primary Examiner*—Lynne H. Browne
*Assistant Examiner*—Greg Binda
*Attorney, Agent, or Firm*—Dinnin & Dunn, P.C.

[57] ABSTRACT

A mechanical face seal for use in a pump. The mechanical face seal including a seal head assembly, a seal seat assembly opposite and in contact with the seal head assembly. The seal head assembly including a gimbal ring engaging a first and second pair of gimbal pads. The first pair of gimbal pads is integral with an impeller insert and the second pair of gimbal pads is integral with a seal washer. The gimbal ring will continually adjust to misalignments of the pump and the seal components when hydraulic forces overcome the spring load of the seal head assembly and clamps the gimbal ring between the two pair of gimbal pads.

37 Claims, 7 Drawing Sheets

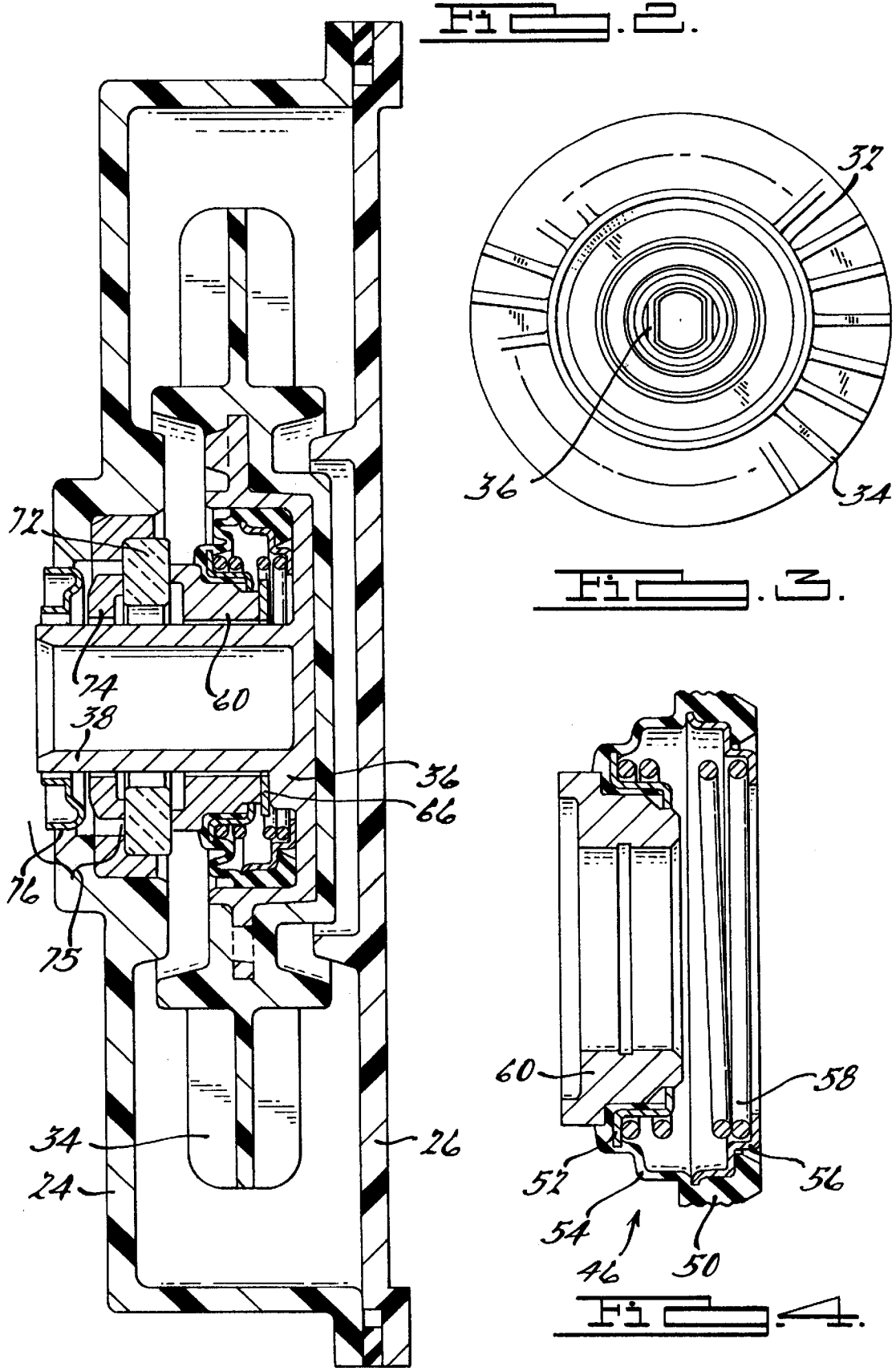

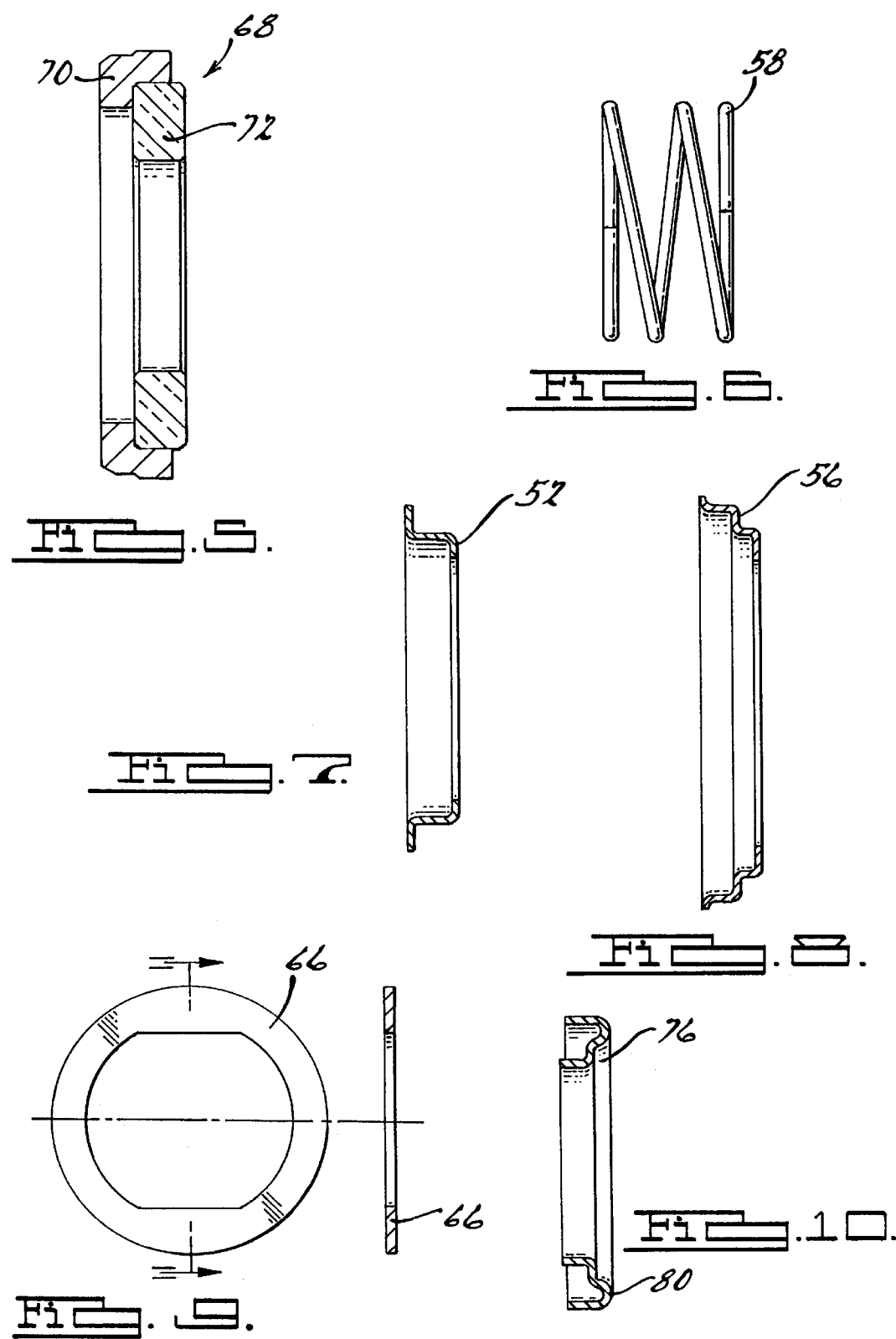

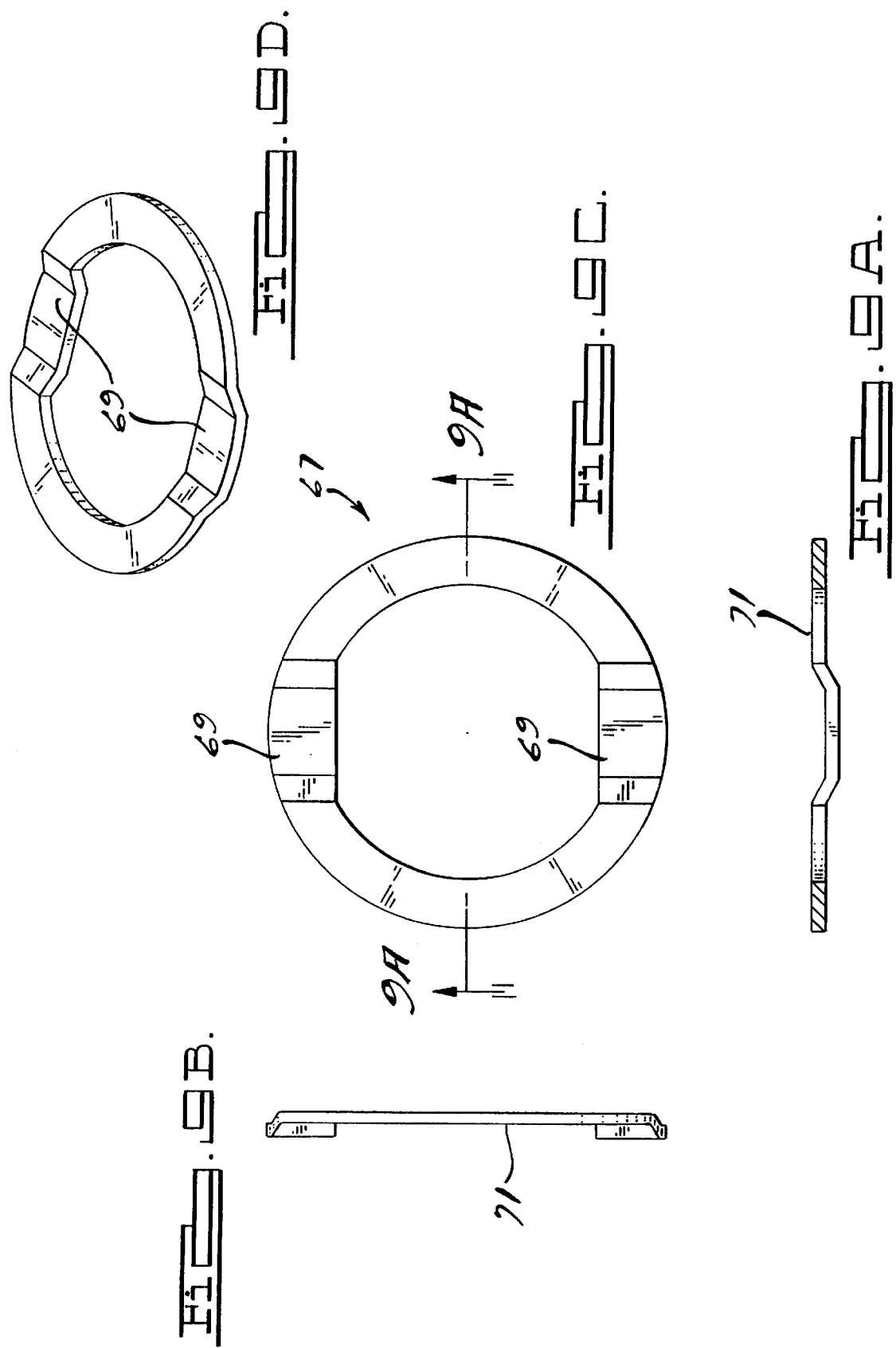

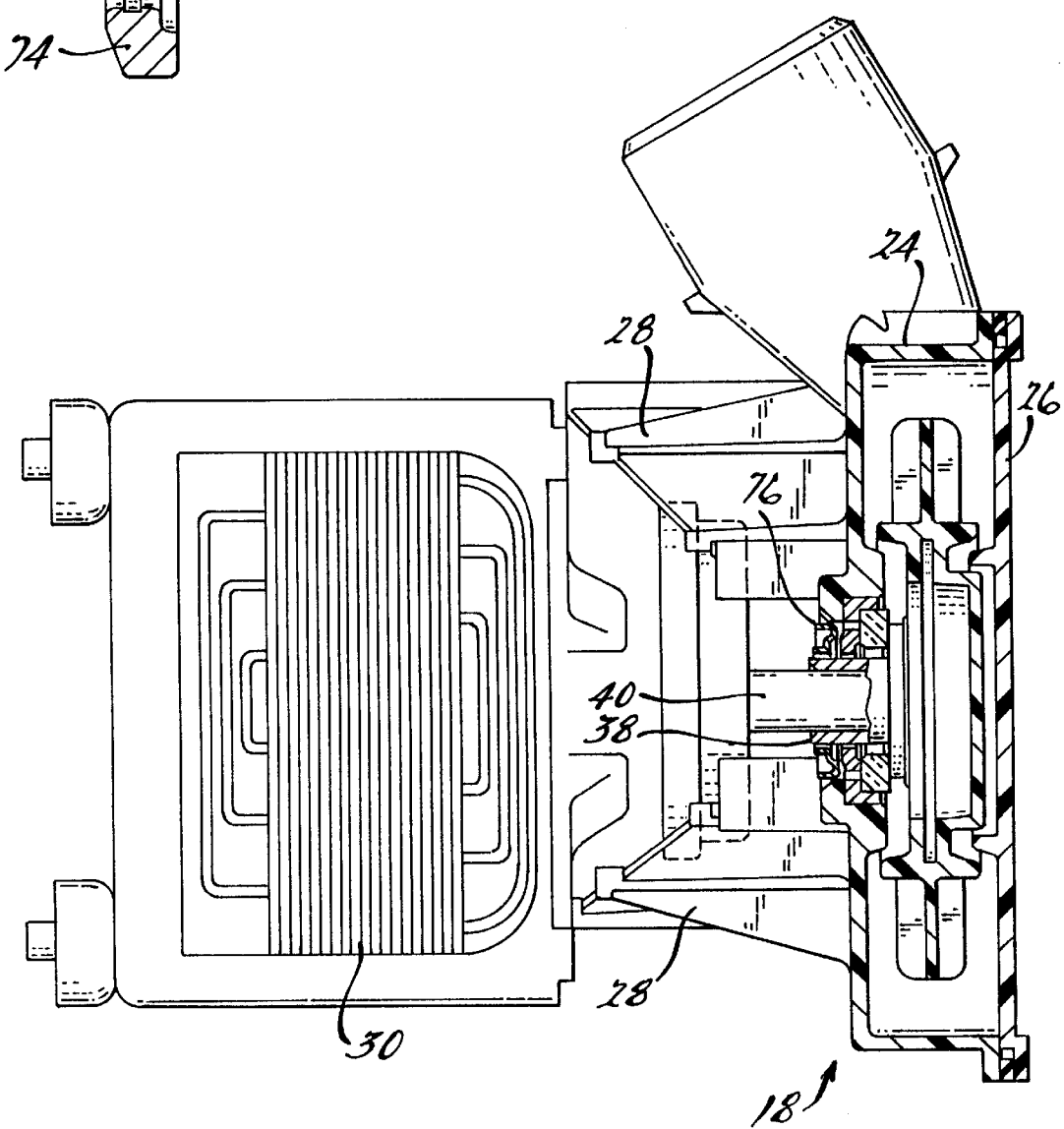

GIMBALLED MECHANICAL FACE SEAL

BACKGROUND OF THE INVENTION

1. Field of the Invention

The present invention relates to pumps, and more particularly to a gimballed mechanical face seal for use in a pump.

2. Description of Related Art

Many appliances used today such as dishwashers, laundry machines, etc., use water pumps that have an impeller that is rotationally driven by a pump motor shaft through rotational locks, such locks can be corresponding flats in the impeller and on the shaft of the motor. However, many of these impeller shaft combinations are free to move axially along the shaft due to radial clearances between the impeller and the shaft. Many of the pumps found in current day appliances use an impeller with a cup shaped recess that fits around but not against the bottom of the end of the motor shaft. This allows substantial clearance between the bottom of the cup shaped recess and the end of the motor shaft and accommodates significant end play of the motor shaft and also accommodates axial tolerances in mounting the pump housing to the motor. The axial positioning of the impeller and the mechanical face seals found within these pumps is independent of the length of the motor shaft and is usually accomplished by spring force of the mechanical face seal holding the impeller against a thrust bearing. The problem with such pumps is that the positive hydraulic pressures developed within the pump work upon a hydraulic area within and effect the hydraulic diameter of the mechanical face seal which results in forces moving the impeller and compressing the seal axially further onto the pump motor shaft.

In prior art appliance pumps movement of the impeller and compression of the seal is prevented by using a spring force in the mechanical face seal which is sufficient to offset the resultant force developed under peak pump hydraulic pressures. The practical pumps of today require a spring force that is two to three times higher than that required for efficient sealing by the mechanical face seal. However, having such high spring forces creates higher than necessary seal wear and frictional heat because most of these pumps operate at considerably less than peak pressure 95% of their operating cycles. However, on the other hand if a high spring load is not provided this will allow the impeller to slide on the shaft of the pump motor compressing the mechanical face seal until the seal is deflected to a solid position. The solid position makes any further seal deflection virtually impossible. With the seal in its solid position it would be unable to accommodate normal misalignments between the pump and motor or misalignments or non-parallel conditions within the pump components without causing non-symmetrical loading and wear of seal components whose flatness is critical in maintaining the sealing function.

Therefore, there is a need in the art for a pump that will allow the use of seal spring loads only sufficient to assure efficient sealing and to allow the impeller to move axially a finite distance.

SUMMARY OF THE INVENTION

One object of the present invention is to provide a new gimballed mechanical face seal.

Another object of the present invention is to provide a pump assembly that uses a gimballed mechanical face seal.

Another object of the present invention is to provide a pump assembly that has a gimballed mechanism which allows more optimum seal spring pre-loads but still accommodates misalignments even when deflected solid through the gimballed mechanism.

Another object of the present invention is to provide a pump assembly that does not require higher spring pre-loads than necessary for sealing simply to prevent axial impeller movement which would otherwise deflect a prior art seal solid.

Another object of the present invention is to provide a pump assembly which at low internal pressure provides a finite axial movement of the impeller which disengages the axial thrust bearing system of the pump thus reducing frictional losses, heat and wear under predominant running conditions.

Still a further object of the present invention is to provide a gimballed mechanical face seal having a gimbal mechanism utilizing an easy and economically manufactured gimbal washer which minimizes or eliminates the nominal axial distance between the abutting surfaces of two ninety degree offset pair of gimbal pads, which are integral to adjacent components, thus keeping the two compensating gimbal planes so defined substantially closer together than prior art gimballed mechanical face seals utilizing gimbal washers having four protrubences or lobes, two diametrically opposed on each side with ninety degree spacing there between, which are more difficult to manufacture and which increase the distance between the two gimbal planes thus reducing gimbal mechanism efficiency due to increased operational movement, friction and wear.

To achieve the foregoing objects the mechanical face seal includes a seal head assembly, a seal seat assembly opposite and in contact with the seal head assembly. The seal head assembly including a boot member, a spring seat, an insert member, a seal washer and a spring extended between the spring seat and insert member. The seal further includes a grommet, and a seal seat, with the seal seat in constant contact with the seal washer. The mechanical face seal also includes a gimbal ring which engages a first and second pair of gimbal pads. The first pair of gimbal pads is integral with an impeller insert and the second pair of gimbal pads is integral with the seal washer. The gimbal ring will continuously adjust to misalignments of the pump and the seal components when required.

One advantage of the present invention is that it provides an economical and efficient gimballed mechanical face seal for use in pumps.

A further advantage of the present invention it that is requires lower spring pre-loads than those required to prevent axial impeller movement which otherwise would deflect a convention seal to solid.

Yet another advantage of the present invention is that the gimballed mechanism allows lower more optimum pre-loads but still accommodates misalignments even when deflect ed solid through the gimballed mechanism.

Yet another advantage of the present invention is that it applies symmetrical forces on seal components having critical functional flatness requirements thus minimizing fluid leakage through the mechanical face seal.

Yet another advantage of the present invention is that it provides a pump in which relatively low internal pressures cause a finite axial movement of the impeller which disengages the axial thrust system of the pump thus reducing frictional losses, heat and wear under predominant portions of the operating cycle.

Yet another advantage of the present invention is that it provides a gimbal mechanism which is easy and economical to manufacture which operates with improved efficiency.

Other objects, features and advantages of the present invention will become apparent from the subsequent description and appended claims, taking in conjunction with the accompanying drawings.

BRIEF DESCRIPTION OF THE DRAWINGS

FIG. 2 shows a cross sectional view of the present invention.

FIG. 3 shows a front view of the present invention.

FIG. 4 shows a cross sectional view of the seal head assembly.

FIG. 5 shows a cross sectional view of the seal seat assembly.

FIG. 6 shows a side view of the spring.

FIG. 7 shows a cross sectional view of the insert.

FIG. 8 shows a cross sectional view of the spring seat.

FIG. 9 shows a top view and a cross sectional view of the gimbal ring.

FIGS. 9A–D show a top, side, cross sectional and plan view of an alternative gimbal ring.

FIG. 10 shows a cross sectional view of the retainer ring.

FIG. 16 shows a cross section view of the thrust washer.

FIG. 17 shows a pump and motor assembly including the gimballed mechanical face seal.

BEST MODE OF CARRYING OUT THE INVENTION AND DESCRIPTION OF THE PREFERRED EMBODIMENT(S)

Figure 1:
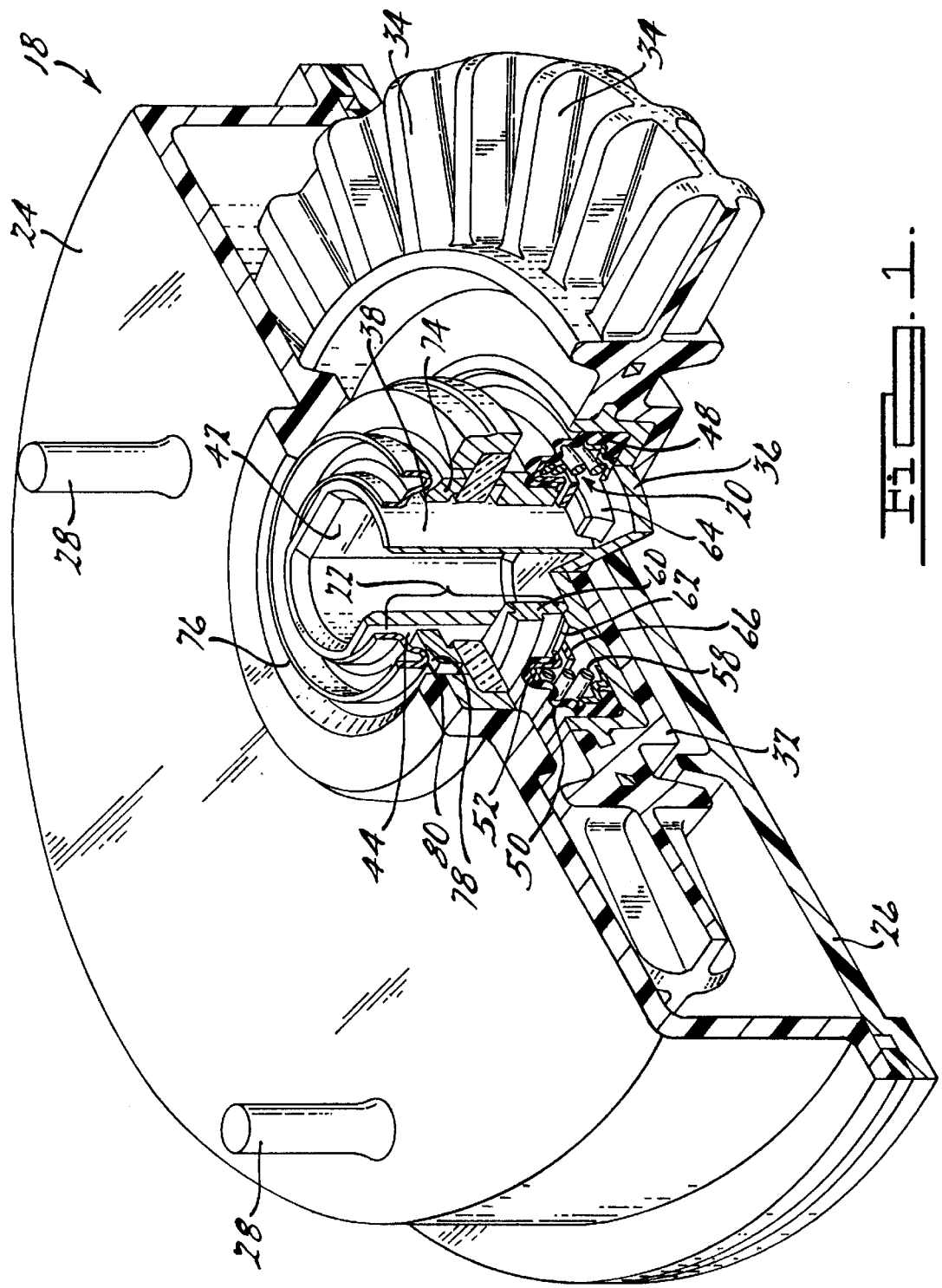
FIG. 1 shows a plan view of the present invention.
Figure 11:
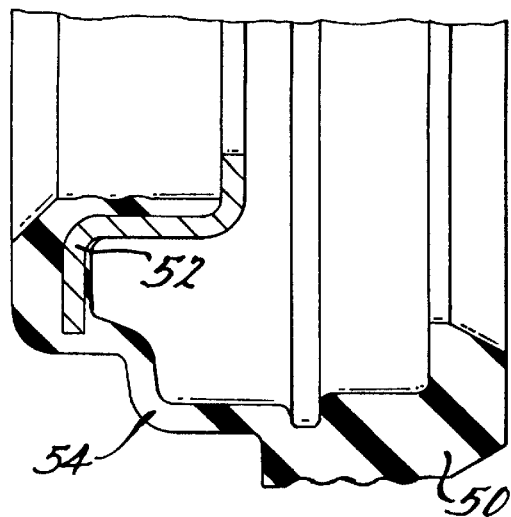
FIG. 11 shows a cross sectional view of the boot with the insert molded into it.
Figure 12:
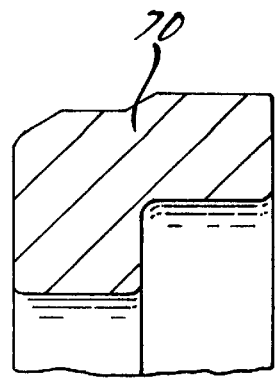
FIG. 12 shows a cross sectional view of the grommet.
Figure 13:
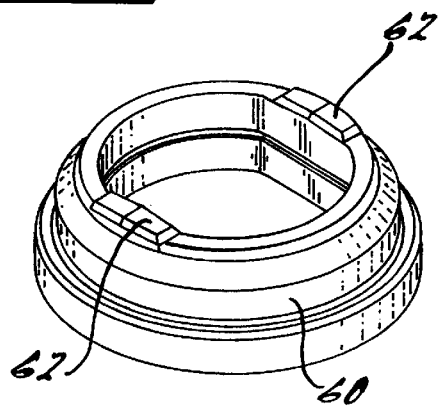
FIG. 13 shows a plan view of the seal washer.
Figure 14:
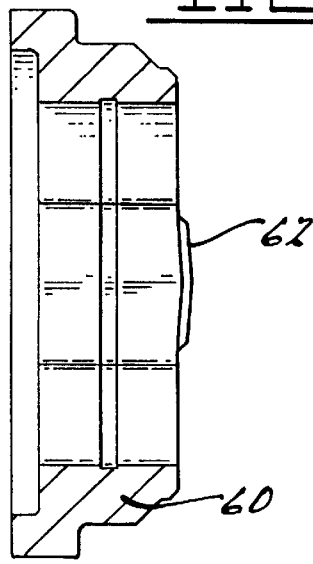
FIG. 14 shows a cross section of the seal washer.
Figure 15:
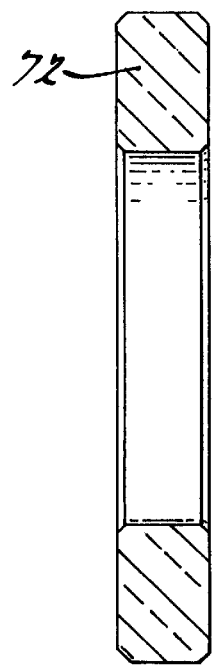
FIG. 15 shows a cross section view of the seal seat.
Figure 18:
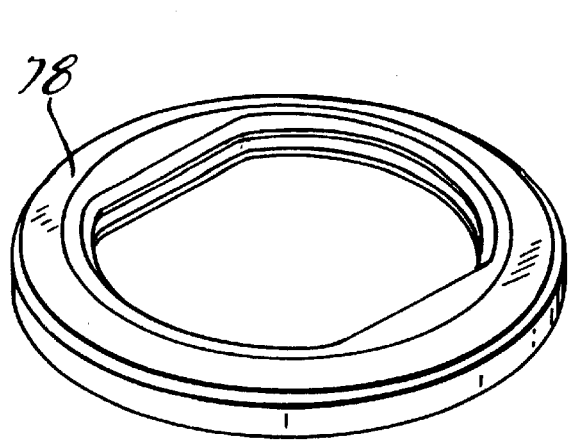
FIG. 18 shows a plan view of the thrust washer.
Figure 19:
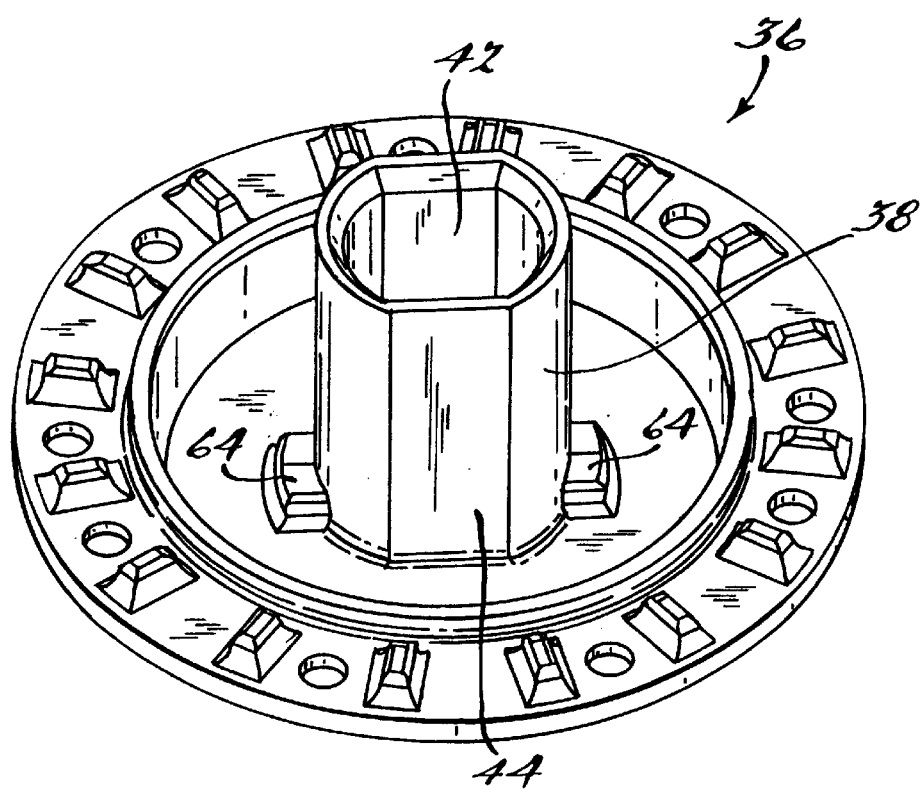
FIG. 19 shows a plan view of the impeller insert.

Referring to the drawings, a gimballed mechanical face seal 20 is disclosed. As shown in FIG. 1, a gimballed unitized seal, impeller, thrust system 22 is shown. Also shown is a pump housing 24 which has a generally U-shaped cross section and a pump cover 26 which connects via welding or other fastening means to the pump housing 24 thus creating the pump for use in appliances such as dishwashers, laundry machines, and the like. The pump cover 26 and the pump housing 24 in the preferred embodiments are made of a filled thermoplastic material however it should be noted that any other hard rigid material may be used such as metals or thermoset plastic type materials. The pump housing 24 also has leg members 28 mounted on or molded into its outer casing which are used to mount the pump to an electric motor 30 or other motorized device.

The pump includes an impeller assembly 32 having a plurality of blades 34 with contoured ends. The impeller 32 forms a circular plate-like shape as shown in FIG. 3, the impeller blades 34 have the appearance of veins and are preferably made of an elastomer or the impeller may be made of a filled thermoplastic material or any other rigid or semi rigid material capable of performing within the pump environment. The impeller 32 is attached to or molded around an impeller insert 36. The impeller insert 36 may either be an integral part of the impeller 32 or it may be attached through bonding or any other securing technique. The impeller insert 36 has a cylindrical projection or tubular neck portion 38 which projects from its axis. The cylindrical projection 38 has first and second flat sided portions (42, 44) on both its inner and outer surfaces, respectively, which are used to mate with and provide rotational drive with a motor shaft 40 from an electric motor 30 and the pump assembly. The shaft 40 will have complimentary flat mating surface areas on its outer diameter to engage the inside of the impeller insert 36. The impeller 32 is designed to have controlled clearances with the pump cover 26 and the pump housing 24, which assure efficient and quiet pumping and yet allow passage of foreign objects through the pump. The impeller 32 and the impeller insert 36 are centered within the pump with the flat portion of the impeller and impeller insert facing the pump cover 26 and the cylindrical projection 38 of the impeller insert 36 projecting towards the pump housing 24.

A seal head assembly 46 engages and is secured within the impeller insert 36. The impeller insert 36 includes a circular seat portion or trough 48 into which the seal head assembly 46 is positioned. The seal head assembly 46 includes a boot member 50 which is preferably made of a thermoset or thermoplastic elastomer however it should be noted that any other suitable material such as a resilient plastic may be used depending on the needs of the pump. An insert 52 is molded within the boot member 50 at one end thereof. The insert 52 is preferably made of a steel material but it should be noted that any other rigid material such as a plastic may be used. The insert 52 generally has a S-shaped cross section. The boot member 50 also includes a flexible bellows portion 54 which connect the two end portions of the elastomer boot 50. The seal head assembly 46 also includes a spring seat 56 which is preferably made of steel but any other rigid material such as a plastic may be used depending on the pump environment. The spring seat 56 is engaged with the boot member 50 opposite of the insert 52 and serves to position and hold the boot member 50 into the impeller insert 36. Extended between the insert 52 and spring seat 56 is a helically coiled wire compression spring 58 made of a metal material. However, it should be noted that any other material capable of having spring-like characteristics may be used and that any other type of spring such as a wavy washer spring may be used. A seal washer 60 is fitted into the inner portion of the boot member 50 reinforced by the insert 52. The seal washer 60 is made of an anti-friction thermoset material but any other type of seal washer material such as carbon graphite may be used depending on the need. The inner diameter of seal washer 60 has flat sided portions which engage corresponding flats on the cylindrical projection 38 of the impeller insert 36 to provide assured rotational drive and assured rotational positioning between the seal washer 60 and the impeller insert 36.

The seal washer 60 also includes a pair of gimbal pads 62 on its bottom surface opposite of its sealing face. The gimbal pads 62 are placed 180° apart from one another on the seal washer bottom face their position coinciding with the flat side portions of the seal washer inner diameter. The gimbal pads 62 are an integral part of the seal washer 60 and are molded directly into the seal washer 60 during production. At 90° intervals from the gimbal pads 62 on the seal washer 60 are located gimbal pads 64 which are an integral part of the impeller insert 36. The gimbal pads 64 on the impeller insert 36 generally have a peaked rectangular shape and protrude from the flat surface of the impeller insert 36 upward along the cylindrical projection 38 and are offset 90° from the flat sided portions 44 of cylindrical projection 38.

The gimbal pads 64 on the impeller insert 36 also are 180° apart from one another. The gimbal pads on the impeller insert 36 and the seal washer 60 both come into contact with opposing sides of a gimbal mechanism consisting of a flat washer shaped gimbal ring 66 made of a steel material. However, it should be noted that any other rigid material of high strength may be used for the gimbal ring 66 depending on the nature of the environment of the pump assembly. The gimbal ring 66 has a circular outer diameter, however the inside diameter of the gimbal ring 66 includes two flat portions such that those flat portions mate with the flat surfaces of the cylindrical projection 38 of the impeller insert 36 to provide assured rotational drive and positioning of the gimbal ring to the impeller insert.

It should be noted the flat washer shaped gimbal ring 66 when engaged allows a minimal distance between the abutting surfaces of the two ninety degree offset pair of gimbal pads (62, 64) integral to the adjacent seal washer 60 and impeller insert 36 respectively. This keeps the distance between the crossing pivotal axes of the two gimbal planes so defined no further apart than the thickness of the stock used to manufacture the gimbal ring 66. This is a substantially smaller distance than prior art gimbal washers typically used in gimballed mechanical face seals having two pairs of lobes offset ninety degrees but protruding from opposite sides and in opposite directions thus increasing their effective width a multiple of the stock thickness used and increasing the distance between their crossing pivotal axes.

In an alternate embodiment of the invention a gimbal ring 67 may be employed having an offset but substantially flat configuration. Offset surfaces 69 which abut against the gimbal pads 62 integral with the seal washer 60 are essentially on the same plane as the opposing ninety degree offset surfaces 71 which abut against the gimbal pads 64 integral with the impeller insert 36. This assures the crossing pivotal axes of the two compensating gimbal planes so defined intersect one another thus achieving maximum gimbal mechanism efficiency.

During pump operation the seal washer 60 of the seal head assembly 46 rotates against the stationary seal seat assembly 68 which is secured in the pump housing 24. The seal seat assembly 68 includes a ring-like grommet 70 made of a thermoset or thermoplastic elastomer, however it should be noted any other suitable resilient material may be used. The grommet 70 generally has an L-shaped cross section and is seated within a circular seat portion which is molded directly into the pump housing 24. Secured within the grommet 70 is a seal seat 72 which has a generally circular shape and a rectangular cross section. The seal seat 72 is preferably made of a hard ceramic material but it should be noted any other suitable material such as an impregnated sintered metal may be used. The seal seat 72 is provided with a flat sealing face which engages with a similarly flat sealing surface of the seal washer 60 and creates an essentially leak tight static and dynamic sealing interface for the mechanical face seal. The spring 58 of the seal head assembly 46 urges the seal washer 60 into constant continuous contact with the seal seat 72 the corresponding flat sealing surfaces of each minimizing the leakage of any fluid through the mechanical face seal.

Adjoining the seal seat 72 is the thrust system 75 for the pump assembly. The thrust system 75 includes a thrust washer 74 which is preferably made of an anti-friction thermoset material, however any other type of bearing material such as carbon graphite may be used depending on the need. The thrust washer 74 has a generally circular shape, however the inside diameter of the thrust washer includes two flat surfaces such that those flat surfaces mate with the flat surfaces of the cylindrical projection 38 of the impeller insert 36 to provide assured rotational drive between the thrust washer 74 and the impeller insert 36. The thrust washer 74 includes a radiused, beveled or angled corner 78 on its rear surface. Securing the thrust washer 74 within the pump is a retainer ring 76 which is preferably made of steel but it should be noted that any other material of sufficient strength such as reinforced plastic or sintered metal may be used. The retainer ring 76 generally has a cup shaped cross section and is circular such that it engages and is secured to the cylindrical projection 38 of the impeller insert 36. The retainer ring 76 includes a protruding torus portion 80 which engages the radiused, beveled or angled corner of the thrust washer 74 to form a ball and socket type connection to continuously accommodate annular movement between the thrust washer 74 and the retainer ring 76.

The retainer ring 76 transmits the initial reaction force of the spring 58 thrust against the impeller insert 36 to the radiused, beveled or angled corner 78 on the rear surface of the thrust washer 74. The axial positioning of the retainer ring 76 when secured along the cylindrical projection or tubular neck portion 38 of the impeller insert 36 determines the initial compression and installed length of the seal head assembly 46. It also determines the initial axial positioning and clearances of the impeller assembly 32 to the pump housing 24 and pump cover 26. It also determines the initial clearance, play provided or allowed for the impeller assembly 46 to move axially along the motor shaft 40 a finite distance under the influence of hydraulic pressures before being restricted from further gross movement by engagement of the gimbal mechanism.

As shown in FIG. 17, the pump 18 is connected to an electric motor 30 which is secured to a base member of an appliance such as a dishwasher or a laundry machine. The shaft 40 of the electric motor 30 includes a pair of flat surfaces that mimic and slidingly engage with the internal flats 42 of the impeller insert 36. This creates a secure but slidable connection which will allow for the rotational torque to be delivered to the impeller blades. The pump 18 is connected and positioned to the electric motor 50 via legs 28.

In operation, once the hydraulic pressures normally developed within the pump and which act on the impeller assembly 32 are sufficient to overcome the normal spring load provided within the mechanical face seal these pressures cause the movement of impeller insert 36, this movement then forces spring seat 56 into and towards spring 58, compessing the spring 58 such that, the impeller assembly 32 will move axially further to the right as shown in FIG. 2, onto the motor shaft 40. This movement disengages the thrust system 75 so that no portion of the reaction force of the spring 58 any longer forces the thrust washer 74 against the seal seat 72. The impeller assembly 32 moves along the motor shaft 40 the small and finite distance allowed before the gimballed mechanism engages which prevents further gross axial movement of the impeller. This engagement occurs when the pair of gimbal pads 64 on the impeller insert 36 clamp the gimbal ring 66 against the ninety degree offset pair of gimbal pads 62 on the bottom of the seal washer 60. With the gimballed mechanism thus engaged the coils of the helical compression spring 58 are still spaced apart and not compressed solidly together and are therefore free to provide an uniform circumferential force urging seal washer 60 into continuous sealing contact with the seal seat 72. Net axial hydraulic thrust forces acting on the impeller assembly 32 which exceed the resistance force of the spring 58 are transmitted through the pair of gimbal pads 62 located 180° apart on the bottom of the seal washer 60. The gimballed mechanism so described provides continual adjustment to and accommodation of normal misalignments and non-parallelisms of the pump and pump components during periods of nominal or peak pressure pump operation whereas the thrust system 75 provides this adjustment and accommodation capability during periods of minimally or nonpressurized pump operation.

The present invention has been described in an illustrative manner, it is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise then as specifically described.

What is claimed is:

1. A mechanical face seal for use in a pump, said seal including:
   a seal head assembly;
   a seal seat assembly opposite and in contact with said seal head assembly;
   said seal head assembly including a first and a second gimbal pad, a boot member, a spring seat secured to said boot member, an insert member secured to said boot member, a seal washer in contact with said boot member and said insert member, a spring engaged between said spring seat and said insert member;
   said seal seat assembly including a grommet, a seal seat secured within said grommet, said seal seat in constant contact with said seal washer;
   a retainer ring which axially locates said seal seat assembly with respect to said seal head assembly; and
   a gimbal ring engaging said first and second gimbal pad, said gimbal ring will continually adjust to misalignments of the pump and the seal assemblies.

2. The mechanical face seal of claim 1 wherein said boot member is axially flexible and said seal washer is reinforced by said insert member.

3. The mechanical face seal of claim 2 wherein said gimbal ring being disposed between at least one member of said seal head assembly fixed axially with respect to said seal seat assembly.

4. The mechanical face seal of claim 3 wherein said member of said seal head assembly is said seal washer.

5. The mechanical face seal of claim 3 wherein said member of said seal head assembly is said insert member.

6. The mechanical face seal of claim 3 wherein said member of said seal head assembly is an end of said boot member reinforced by said insert member.

7. The mechanical face seal of claim 3 wherein said gimbal ring engages a first and second pair of gimbal pads, said first pair of gimbal pads includes said first and second gimbal pads, said first and second gimbal pads are integral with at least one member of said seal head assembly which is fixed axially with respect to said seal seat assembly, said second pair of gimbal pads moves axially with respect to said seal seat assembly.

8. The mechanical face seal of claim 7 wherein said first pair of gimbal pads is integral with said seal washer and said second pair of gimbal pads is integral with an impeller insert.

9. The mechanical face seal of claim 7 wherein said gimbal ring is essentially a flat washer which keeps crossing pivotal axes of two gimbal planes separated a distance equal to a stock thickness used to manufacture said gimbal ring.

10. The mechanical face seal of claim 7 wherein said spring urges said seal washer into said seal seat and wherein said spring remains compliant when said gimbal ring is clamped between said gimbal pads.

11. The mechanical face seal of claim 2 wherein said gimbal ring being disposed between a member of said seal head assembly which moves axially with respect to said seal seat assembly.

12. The mechanical face seal of claim 11 wherein said member of said seal head assembly is said spring seat.

13. The mechanical face seal of claim 11 wherein said member of said seal head assembly is an end of said boot member secured by said spring seat.

14. The mechanical face seal of claim 11 wherein said member of said seal head assembly engages a pump impeller.

15. The mechanical face seal of claim 11 wherein said member of said seal head assembly engages an impeller insert.

16. A mechanical face seal for use in a pump, said seal including:
   a seal head assembly;
   a seal seat assembly opposite and in contact with said seal head assembly;
   said seal head assembly including a boot member, a spring seat secured to said boot member, an insert member secured to said boot member, a seal washer in contact with said boot member reinforced by said insert member, a spring engaged between said spring seat and said insert member;
   said seal seat assembly including a grommet, a seal seat secured within said grommet, said seal seat in constant contact with said seal washer;
   a gimbal ring engaging a first and second pair of gimbal pads, said first pair of gimbal pads is integral with an impeller and said second pair of gimbal pads is integral with said seal washer, each pair of pads being separated 180°, said first and second pair of pads being offset from one another by 90°, said gimbal ring will continually adjust to misalignments of the pump and the seal assemblies when clamped between said two pairs of gimbal pads; and
   said gimbal ring is an offset essentially flat washer which makes crossing pivotal axes of two gimbal planes intersect one another.

17. The mechanical face seal of claim 16 wherein said gimbal ring applies symmetrical forces on said seal washer when clamped between said seal washer integral gimbal pads and said impeller integral gimbal pads.

18. A mechanical face seal for use in a pump, said seal including:
   a seal head assembly;
   a seal seat assembly opposite and in contact with said seal head assembly;
   said seal head assembly including a first and a second gimbal pad, a boot member, a spring seat secured to said boot member, an insert member secured to said boot member, a seal washer in contact with said boot member and said insert member, a spring engaged between said spring seat and said insert member;
   said seal seat assembly including a grommet, a seal seat secured within said grommet, said seal seat in constant contact with said seal washer;

a gimbal ring engaging said first and second gimbal pad, said gimbal ring will continually adjust to misalignments of the pump and the seal assemblies; and said gimbal ring allows optimum predetermined pre-loads regardless if said spring is compressed solid under influence of hydraulic forces and regardless if said spring will be rendered incapable of providing uniform circumferential force when said seal is adjusting to accommodate normal misalignments and non-parallelism.

19. A pump assembly using a gimballed sealing system, said assembly including:

a pump housing connected to a pump cover;

a gimballed unitized seal, impeller, thrust system secured between said pump housing and said pump cover;

an electric motor including a motor shaft attached to said pump housing, said motor shaft slidingly engagable with an impeller, said shaft providing a rotational drive force; and said unitized system having said impeller connected to an impeller insert, a seal head assembly engaging said impeller insert, a seal seat assembly engaging said seal head assembly and said pump housing, and a thrust washer engaging said seal seat assembly and a retainer ring engaging said impeller insert and said thrust washer.

20. The pump assembly of claim 19 wherein said seal head assembly includes a gimbal ring that engages a first and second pair of gimbal pads and said gimbal ring touches said seal head assembly during operation of the pump assembly.

21. The pump assembly of claim 20 wherein said gimbal ring provides continual adjustments to misalignments of said pump assembly and said seal assemblies when clamped between said first and second pair of gimbal pads during periods of said pump assembly operation with internal hydraulic pressures.

22. The pump assembly of claim 21 wherein said gimbal ring is an offset essentially flat washer which makes crossing pivotal axes of two gimbal planes intersect one another.

23. The pump assembly of claim 21 wherein said gimbal ring is an essentially flat washer which keeps crossing pivotal axes of two gimbal planes separated a distance equal to a stock thickness used to manufacture said gimbal ring.

24. The pump assembly of claim 20 wherein said first pair of gimbal pads is integral with said impeller insert.

25. The pump assembly of claim 20 wherein said second pair of gimbal pads is integral with a seal washer.

26. The pump assembly of claim 20 wherein said gimbal ring applies symmetrical forces on said seal head assembly when said gimbal ring engages said first and second pair of gimbal pads during operation of the pump assembly.

27. The pump assembly of claim 26 wherein said gimbal ring has a first and second flat surface on an inner diameter.

28. The pump assembly of claim 26 wherein said gimbal ring engages said first and second pair of gimbal pads during periods of nominal or peak pressure operation and said gimbal ring disengages either pair of gimbal pads during periods of minimal or non-pressurized operation.

29. The pump assembly of claim 19 wherein said seal head assembly includes a boot member, an insert reinforcing said boot member, a spring seat engaging said boot member, a seal washer touching said boot member reinforced by said insert, a spring extending between said insert and said spring seat.

30. The pump assembly of claim 19 wherein said impeller having an integral impeller insert.

31. The pump assembly of claim 19 wherein said impeller has a plurality of elastomeric blades.

32. The pump assembly of claim 19 wherein said retainer ring locates and secures said seal head assembly, said seal seat assembly, said impeller, and a thrust system with respect to one another and determines running clearances of said impeller with respect to said pump housing and cover during operation.

33. The pump assembly of claim 19 wherein said thrust washer includes a beveled corner and said retainer ring includes a protruding torus.

34. The pump assembly of claim 33 wherein said beveled corner and said torus create a ball and socket type joint.

35. The pump assembly of claim 34 wherein said ball and socket type joint allows continual adjustments to misalignments of said pump and said seal assembly during periods of pump operation with lower hydraulic pressures than peak pressures developed during brief portions of an operating cycle.

36. The pump assembly of claim 35 wherein said ball and socket joint disengages upon achieval of pump internal hydraulic pressures.

37. A mechanical face seal for use in a pump, said seal including:

a seal head assembly;

a seal seat assembly opposite and in contact with said seal head assembly;

said seal head assembly including a first and a second gimbal pad, a boot member, a spring seat secured to said boot member, an insert member secured to said boot member, a seal washer in contact with said boot member and said insert member, a spring engaged between said spring seat and said insert member said boot member is axially flexible and said seal washer is reinforced by said insert member, said seal seat assembly including a grommet, a seal seat secured within said grommet, said seal seat in constant contact with said seal washer; and a gimbal ring engaging said first and second gimbal pad, said gimbal ring will continually adjust to misalignments of the pump and the seal assemblies, said gimbal ring being disposed between a member of said seal head assembly fixed axially with respect to said seal seat assembly, said gimbal ring engages a first and second pair of gimbal pads, said first and second pads are integral with at least one member of said seal head assembly which is fixed axially with respect to said seal seat assembly, said second pair of gimbal pads moves axially with respect to said seal seat assembly, said gimbal ring is an offset essentially flat washer which makes crossing pivotal axes of two gimbal planes intersect one another.

* * * * *